US008365263B2

(12) United States Patent
Dasch et al.

(10) Patent No.: US 8,365,263 B2
(45) Date of Patent: Jan. 29, 2013

(54) METHOD FOR MANAGING USAGE AUTHORIZATIONS IN A DATA PROCESSING NETWORK AND A DATA PROCESSING NETWORK

(75) Inventors: Thomas Dasch, Nürnberg (DE); Lutz Dominick, Eggolscheim (DE)

(73) Assignee: Siemens Aktiengesellschaft, Munich (DE)

( * ) Notice: Subject to any disclaimer, the term of this patent is extended or adjusted under 35 U.S.C. 154(b) by 700 days.

(21) Appl. No.: 12/318,454

(22) Filed: Dec. 30, 2008

(65) Prior Publication Data

US 2009/0183228 A1 Jul. 16, 2009

(30) Foreign Application Priority Data

Jan. 16, 2008 (DE) .......................... 10 2008 004 656

(51) Int. Cl.
G06F 7/04 (2006.01)
(52) U.S. Cl. .................... 726/7; 726/9; 726/17; 726/19; 726/28
(58) Field of Classification Search .................. 713/150, 713/164–167, 182–186; 726/2–10, 16–21, 726/26–30; 707/999.009; 705/50–51, 57, 705/59, 1.1, 2, 3
See application file for complete search history.

(56) References Cited

U.S. PATENT DOCUMENTS

| 7,568,217 | B1 * | 7/2009 | Prasad et al. ........................ 726/3 |
| 7,870,270 | B1 * | 1/2011 | Singh et al. .................... 709/229 |
| 2003/0172280 | A1 * | 9/2003 | Scheidt et al. ................ 713/182 |
| 2004/0186809 | A1 * | 9/2004 | Schlesinger et al. ............ 705/50 |
| 2004/0210771 | A1 * | 10/2004 | Wood et al. .................... 713/201 |
| 2004/0230488 | A1 * | 11/2004 | Beenau et al. ................... 705/18 |
| 2005/0091338 | A1 * | 4/2005 | de la Huerga ................. 709/217 |
| 2005/0097320 | A1 | 5/2005 | Golan et al. |
| 2005/0246762 | A1 * | 11/2005 | Girouard et al. .................. 726/2 |

(Continued)

FOREIGN PATENT DOCUMENTS

DE 10209780 B4 4/2003
EP 1176489 A2 1/2002

OTHER PUBLICATIONS

"ISO/IEC 27002, Information technology—Security techniques—Code of practice for information security management," Jun. 15, 2005, International Organization for Standardization.*
Alsulaiman, F.A. et al. "Threshold-based Collaborative Access Control (T-CAC)," Collaborative Technologies and Systems, May 25, 2007, pp. 46-56.*

(Continued)

Primary Examiner — Darren B Schwartz
(74) Attorney, Agent, or Firm — Harness, Dickey & Pierce, P.L.C.

(57) ABSTRACT

To facilitate the work of a user with a data processing network with a number of security levels of the applications and functions to be executed, a method is proposed for managing usage authorizations in this data processing network. In at least one embodiment of the method, when a user logs in at a work station, at least one role stored in a central authorization register is allocated to the user; when an application is called up a local security module of the application determines which authorizations are granted for the role of the user; and if there is no authorization for an application-related action, a central security module accesses a central collection of security rules, the security rules indicating the circumstances, in which, when a user's authorizations are not sufficient to carry out the application-related action, the user can still carry it out and determines whether according to at least one of the security rules a usage authority is possible for the application-related action and offers this to the user.

15 Claims, 1 Drawing Sheet

U.S. PATENT DOCUMENTS

| | | | |
|---|---|---|---|
| 2006/0185005 A1* | 8/2006 | Graves et al. | 726/9 |
| 2006/0242422 A1* | 10/2006 | Hong et al. | 713/182 |
| 2006/0288095 A1* | 12/2006 | Torok et al. | 709/223 |
| 2007/0016795 A1* | 1/2007 | Asano | 713/182 |
| 2008/0172720 A1* | 7/2008 | Botz et al. | 726/3 |
| 2009/0007262 A1* | 1/2009 | Wallace et al. | 726/21 |
| 2009/0038004 A1* | 2/2009 | Blasko | 726/20 |

OTHER PUBLICATIONS

Barth, Stefan "SuSe Linux Konfiguration" 4. edition, SuSe GmbH, 2001, p. 57; and English Translation Thereof.

Alt. J, "Einführung in UNIX" Leibnitz Rechenzentrum, Jun. 7, 1993, p. 2-5,16-19; and English Translation Thereof.

* cited by examiner

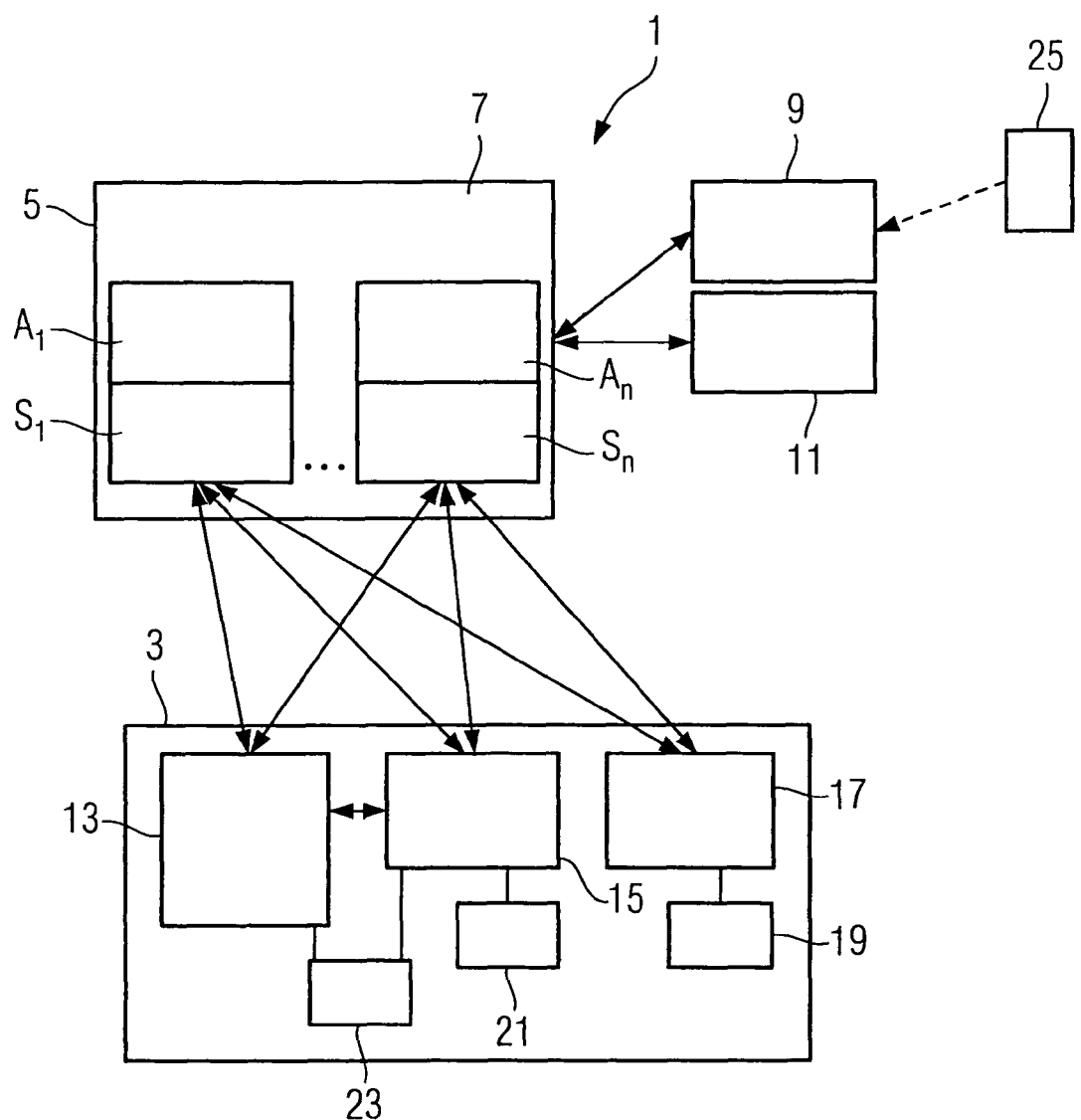

METHOD FOR MANAGING USAGE AUTHORIZATIONS IN A DATA PROCESSING NETWORK AND A DATA PROCESSING NETWORK

PRIORITY STATEMENT

The present application hereby claims priority under 35 U.S.C. §119 on German patent application number DE 10 2008 004 656.6 filed Jan. 16, 2008, the entire contents of which is hereby incorporated herein by reference.

FIELD

Embodiments of the invention generally relate to a method for managing usage authorizations in a data processing network. Embodiments of the invention also generally relate to a data processing network for implementing the method.

BACKGROUND

In medical engineering, in particular in the field of radiology, data processing networks are operated in an alternating manner by different users. Generally each user requiring access to a data processing facility has to log in to the facility by inputting a user name and a password at a work station. After logging in successfully the users starts a workflow, e.g. to process and evaluate image data, with one or more application programs, hereafter referred to simply as applications, being called up and used. Such an application comprises a plurality of functions, with different classifications with a view to enhanced security, so that only users with higher authorization levels can execute certain functions. It may therefore be that to carry out some application-related actions, e.g. to execute different applications or different functions of an application, an additional user identification is frequently required for security reasons, it being necessary for example to input a further password. However this procedure takes more time and is associated with a major mental effort for the user, as the user has to remember a number of passwords needed for the individual application functions.

SUMMARY

At least one embodiment of the invention is directed to facilitating work with a data processing network with a number of security levels and/or with multi-stage usage authorization.

According to at least one embodiment of the invention, a method is disclosed for managing usage authorizations in a data processing network, wherein
when a user logs in at a work station, at least one role stored in a central authorization register is allocated to the user,
when an application is called up a local security module of the application determines which authorizations are granted for the role of the user and wherein
if there is no authorization for an application-related action, a central security module accesses a central collection of security rules, the security rules indicating the circumstances, in which, when a user's authorizations are not sufficient to carry out the application-related action, the user can still carry it out and determines whether according to at least one of the security rules a usage authority is possible for the application-related action and offers this to the user.

At least one embodiment of the invention is based on the consideration that carrying out application-related actions, such as the use and execution of applications and functions with different security levels, is made easier for the user, in that a central collection of security rules is made available and the central security module uses the security rules to check or determine the circumstances in which the user may be granted authority to execute the application or function, even if the user has not been given authorization for this at login. The central security module hereby determines or checks in a totally independent manner whether the granting of such an authority is possible and if so, according to which security rules it can take place, and offers the user this authority automatically.

When the user logs in at a work station, the user is generally allocated a role, e.g. the role of "medical technical assistant", "radiologist", "cardiologist", "surgeon" or "system administrator". The various roles are stored in a central authorization register, which a login application can access from each work station. Different usage authorizations are also allocated to the individual roles. When an application is called up, a local security module of the application checks or determines the actions for which the role of the user is authorized according to the security settings of the application. These actions are carried out automatically without additional identification of the user. It is not until the user wishes to carry out an action for which he/she is not authorized, that the central security module checks or determines whether and according to which security rules and in which circumstances the action can be carried out. The security rules hereby define the exceptions, in which the user may execute the application despite a lack of authority. These exceptions are not known, until the application for which the authorizations do not suffice is called up and the search for an appropriate security rule is only started after it has been determined that the authorizations allocated to the user are not sufficient for executing the application.

The security rules are preferably configurable with a view to a particularly high level of flexibility when using the data processing network. In other words the security rules can be amended, deleted or even new security rules can be created locally, in other words by a system administrator.

According to an example variant of an embodiment, to log in at the work station, data from a portable identification object of by the user is read wirelessly by means of a login read device. This allows simple and fast access to the data processing network, as the user logs in wirelessly at the work station. The portable identification object carried by the user exchanges data wirelessly with the login read device, as soon as the identification object is in sufficient proximity to the login read device, in other words as soon as the identification object is in the detection range of the login read device. When the mobile identification object is detected by the login read device, the user is automatically allowed access to the data processing network as a whole from the corresponding work station. For example as soon as the user is 50 cm or less from the login read device, the work station "opens" for the user.

According to a further example variant of an embodiment, an RFID chip (Radio Frequency Identification) is used as the identification object. Both RFIDs with their own energy supply and RFIDs having no energy supply of their own can be used as identification objects. The latter draw the energy required for their operation solely from electromagnetic energy scattered in from the login read device. The RFID chip offers a particularly high level of user-friendliness, as the chip only has a small space requirement and can be carried easily in a garment pocket for example and does not have to be removed from the pocket for the initial login at the work station, so that both the user's hands are free.

The work of the user is also facilitated in that where a number of security rules are determined, which allow the application-related action to be carried out, the central security module preferably selects one security rule automatically. This means that the central security module is able to decide itself, based on a predetermined, in particular configurable, prioritization, the conditions in which the execution of the application or function is associated with the smallest outlay for the user.

According to a preferred development provision is made, in at least one embodiment, if a security rule allows the application-related action to be carried out without additional identification of the user, for this security rule to be executed automatically by the central security module. Thus if a security rule offers the possibility of the application or function being able to be executed without involving the user, the central security module opts automatically for this security rule. The application-related action is carried out in particular in such a manner that the user does not notice the processes running in the background in the data processing network at all.

The application-related action, for which the role of the user is not authorized, can be carried out automatically, if for example the user can assume more than one role and one of the further roles is authorized to execute the application or function. Provision is therefore advantageously made for the central security module to determine whether the user can assume more than one role and if one of the further roles has the authorization to carry out the application-related action, this authorization is automatically transferred to the current role, with which the user logged in.

If a number of security rules are determined, none of which however provides for automatic execution of the application or function, but with the aid of which the application-related action can be carried out after further identification of the user, the central security module preferably displays a list of these security rules for selection. The user is therefore given the opportunity to decide him/herself, according to which security rule or in which circumstances the application or function is to be executed.

Expediently for the additional identification of the user a chip card is optionally read by a card reader or a biometric scanner is used to read in biometric data of the user or the user is asked to input a password or the user is asked to input a PIN number. Further processes can also be considered for identifying the user, for the implementation of which appropriate apparatuses are connected to the data processing network.

It is also advantageous that the central security module proposes a security rule, which is determined based on an in particular configurable prioritization. The central security module selects a security rule as being particularly suitable and highlights it in relation to the further determined security rules, for example by putting it at the top of the displayed list of security rules or by identifying it optically by means of a different color, font or font size.

To allow the application-related action to be carried out in a problem-free manner, when the security rules are output, the central security module preferably determines which devices required for execution of the security rules are connected to the work station. For example if a chip card has to be read according to a security rule for carrying out the application-related action, the central security module determines whether a card reader is connected to the work station. If no card reader is available, this security rule is not considered.

To enhance security when working with the data processing network after a user has logged in, the user is automatically logged off after a defined inactive time period. The time period can be configured in particular by an authorized person. If the user carries out no actions using the data processing network, for example over a time period of 5 minutes, the user is logged off automatically, to prevent possible access for unauthorized persons by way of the user profile that is active at the work station.

The various roles are generally characterized by different tasks and/or by the use of different applications and functions. These tasks also take different lengths of time. To organize work with the data processing network in a particularly user-friendly manner and at the same time to ensure a high level of security, provision is therefore preferably made for different time periods for automatic logging off of the user to be defined for the various roles.

It is also advantageous that to carry out the application-related action by way of a temporary login of a further user at the work station, it is possible to take over the user's role and the assigned authorizations. If the originally logged in user cannot execute the application or function in any manner with his/her own role, he/she can as it were borrow the identity or the role and authorizations of a colleague. This operating mode of the data processing network is referred to as "handover". The further user logs in, for example using his/her password, to execute the specific application or function, with the settings of the original user in particular being maintained. After the specific application-related action has been carried out, the further user is preferably automatically logged off, to prevent possible abuse of his/her usage authorizations.

In practice it also happens that a logged in user, who has opened or executed a number of applications for his/her work, is urgently required at another location and cannot complete his/her work. According to an example variant of at least one embodiment, provision is made in such an instance for roles to be switched after a further user logs in at the work station, with the settings of the first user being maintained. This procedure is also referred to as "switch on-the-fly". Here the further user does not have to carry out a full new login but takes over the settings and workflow already implemented by the first user, to complete the work that has already been started.

According to at least one embodiment of the invention, a data processing network is disclosed with a number of individual devices, which are set up in respect of data to implement the method according to one of the previous embodiments. The advantages and preferred embodiments listed in respect of the method can also be applied accordingly to the data processing network.

According to an expedient development of at least one embodiment there is provision for the use of the data processing network to process medical data, in particular image data.

BRIEF DESCRIPTION OF THE DRAWINGS

An example embodiment of the invention is described in more detail below with reference to a drawings, The only FIGURE shows a data processing network, which is provided for use in a clinic.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the FIGURES.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers; steps, operations, elements, components, and/or groups thereof.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a schematic diagram of a data processing network 1, which generally comprises a central level 3 and a local level 5. In this example embodiment the data processing network 1 is used to process medical data, for example two-dimensional or three-dimensional image data, which was obtained with the aid of a medical imaging apparatus, e.g. a computed tomograph. In the example embodiment shown the local level 5 is indicated by a single work station 7, to which read devices 9 and 11 are connected. However the data processing network 1 generally comprises a number of such work stations, all of which communicate with the central level 3.

In the FIGURE the block 9 represents an RFID login read device and the block 11 a card read device. After logging in at the work station 7 a user can call up a number of applications for processing the image data. FIG. 1 shows two such applications $A_1$ and $A_n$ for example. Each application $A_1$, $A_n$ is assigned a local security module $S_1$, $S_n$ which determines the authorizations of the logged in user for executing the specific application $A_1$, $A_n$ or a function of the application $A_1$, $A_n$.

In the example embodiment shown the central level 3 of the data processing network 1 comprises a central security module 13, an authorization register 15 and an authentication register 17, which communicate in respect of data with the local security modules $S_1$, $S_n$ of the individual applications $A_1$, $A_n$. The authentication register 17 comprises a database 19 with stored profiles of users, to whom access to the work station 7 is granted. The authorization register 15 for its part comprises a database 21, in which various configurable user roles, such as "radiologist", "medical technical assistant", "surgeon", etc. are stored. The authorization register 15 also comprises a central collection 23 of security rules, which the central security module 13 can also access directly. These security rules are configurable, so they can be created, amended or deleted locally by an authorized user.

The security rules in particular indicate the circumstances in which a logged in user, whose authorizations are not sufficient to carry out an application-related action, can still execute this. The search for an appropriate security rule takes place in a number of directions. For example security rules are sought, which allow execution of the application $A_1$, $A_n$ by inputting a password or a PIN number as well as those security rules, with which the further possible roles of the user are checked or determined, in order possibly to extend his/her current authority to include the authorizations of his/her further roles.

An application-related action here is understood as the execution of an application program $A_1$, $A_n$ or a function of the application program $A_1$, $A_n$, e.g. signing a document. For example a specific user, for whose role generally no authorization is present, can obtain this authorization according to one of the security rules. In this instance this specific user will be able to execute the application $A_1$, $A_n$ or function, while all other users with the same role are unable to do so.

The process of using the data processing network 1 to process medical image data can take place as follows. A user, for example a physician, carries in or on his/her clothing an identification object 25, in this example embodiment an RFID chip. This identification object 25 is able to exchange data with the RFID login read device 9 in a contactless manner, as shown by a broken line in the FIGURE. The RFID login read device 9 reads data out from the identification object 25 as soon as this moves within the detection range of the access control device. The RFID login read device 9 can be set in such a manner that it reads the data out from the RFID chip 25, when the user is a few meters away. A detection range that extends no more than 50 cm from the login read device 9 is particularly appropriate.

After the contactless data transfer between the RFID chip 25 and the login read device 9 a login application $A_1$ is started, which routes the user-specific data received by the login read device 9 to the authentication register 17, to determine whether the user is authorized to log in at the work station 7. When the user has logged in successfully, the local security module $S_1$ of the login application $A_1$ applies to the authorization register 15, to call up a role provided for the user with its assigned user profile and usage authorizations. All this takes place automatically, without the user being asked to input his/her user name, password or PIN number. When logging in automatically at the work station 7 the user receives a set of basic authorizations for his/her role, so that he/she can execute a number of applications $A_1$, $A_n$ and functions in a problem-free manner without any further identification process when working.

After logging in automatically the user can start working immediately at the work station 7. It may be however that the basic authorizations allocated to the role of the user are not sufficient to carry out an action, such as the execution of an application $A_1$, $A_n$ or a function, as there is a higher security level. This is determined by the local security module $S_n$ of the application $A_n$. In this instance the local security module $S_n$ applies to the central security module 13 to search for a possible solution to the problem. The central security module 13 then determines whether the required authorizations can be granted to the user according to at least one security rule. The central security module 13 selects a security rule or a set of security rules, which are associated with the smallest labor and time outlay for executing the application $A_1$, $A_n$ or function and displays these to the user, for example in the form of a list.

If it is possible according to at least one of the security rules for the application-related action to be carried out without additional identification of the user being required, the central security module 13 selects this security rule automatically and allows the user to execute the application $A_1$, $A_n$ or the function in a problem-free manner. This can be the case for example if the user is authorized to assume more than one role. It can happen that the user with his/her current role is not authorized to execute the application $A_1$, $A_n$ or function. If this authorization is allocated to one of his/her further roles however, the authorization is transferred to the current role.

When selecting the security rules, which allow the action of a higher security level to be carried out, the central security module 13 also takes into account which devices are connected to the work station 7. If for example further identification of the user is required to extend user authorizations, this can be done by way of a chip card, which is read by the read device 11. In this instance the central security module 13 determines whether a read device 11 is connected to the work station 7. Further possibilities for identifying the user include for example inputting a password or PIN number, so the central security module 13 determines whether a keyboard is connected.

The list of determined security rules is displayed to the user in such a manner that one of the security rules, which has been determined by the central security module 13 based on a prioritization, is highlighted. The insertion of a chip card in a read device has the highest priority here in particular, as this action requires the minimum of mental outlay on the part of the user. If the user does not have his/her chip card with him/her at the time, he/she can still select a security rule, which provides for example for the inputting of a password or PIN number or the reading in of biometric data.

In the example embodiment shown security rules are also provided, which relate to a number of users working together. According to these security rules for example "hand-over" and "switch on-the-fly" operations are possible. With "hand-over" operating mode the higher rights of a further user for carrying out a specific application-related action are transferred, after the further user has logged in with his/her user profile at the same work station 7. The settings of the originally logged in user are hereby retained and after execution of the application $A_1$, $A_n$ or function the further user is automatically logged off. The "switch on-the-fly" mode provides for a further user to log in and be able to take over the settings and workflow of the original user in his/her profile. The work of the first user is thus continued by a further user, who may have higher authorizations.

To enhance security when working at the work station 7 provision is also made for automatic logging off from the data processing network 1 if the user logs on and then however remains inactive for some time. The time period before automatic logging off is defined and is a function of the role of the user and/or the security level of the active applications. If an application is started, which is characterized by a higher security level or by specific authorizations, automatic logging off takes place after a shorter time than if just the set of basic authorizations were sufficient for the active applications. The time period, like the security rules, the roles and in particular the security requirements of the application programs, are configurable and can therefore be created, amended or deleted locally by an authorized person.

Thanks to the central security module 13 the described data processing network 1 is characterized in that the collection 23 of configurable security rules can be accessed and by a particularly high level of flexibility and ensures the most problem-free processing of image data possible, even if application programs $A_1$, $A_n$ and functions are necessary, which require higher usage authorizations than those allocated to the role of the user.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS

1 Data processing network
3 Central level
5 Local level
7 Work station
9 Login read device
11 Card reader
13 Central security module
15 Authorization register
17 Authentication register
19 Database containing user profiles
21 Role database
23 Collection of security rules
25 Identification object
$A_1, A_n$ Applications
$S_1, S_n$ Local security modules

What is claimed is:

1. A method for managing usage authorizations in a data processing network, comprising:
   allocating at least one role stored in a central authorization register to a user, upon a portable identification object of the user being read wirelessly by a login read device to log the user in at a work station of the data processing network, such that the user can execute a number of applications and functions without a further identification process;
   determining, upon an application being called up and via a local security module of the application, authorizations granted for the allocated at least one role of the user;
   accessing via a central security module, when there is not sufficient authorization granted for an application-related action, a central collection of security rules indicating circumstances in which, when the granted authorizations are not sufficient to carry out the application-related action, the user can still carry out the application-related action;
   determining whether, according to at least one of the security rules, a usage authority is possible for the application-related action and conveying the possibility, when determined, to the user; and
   upon determining that there is not sufficient authorization granted to the allocated at least one role of the user with which the user is logged in to carry out the application-related action,
   determining that the user is allocated at least one further role in addition to the role with which the user is logged in,
   determining that the at least one further role has sufficient authorization to carry out the at least one application-related action,
   transferring the authorization of the at least one further role to carry out the application-related action to the role with which the user is logged in, and
   executing a security rule that allows the application-related action to be carried out without additional identification of the user,
   wherein when further identification of the user is necessary for the user to carry out the application-related action and more than one security rule permits execution of the application-related action, the central security module at least one of a) selects one security rule, b) displays a list of the security rules for user selection and c) proposes a security rule determined based on a prioritization.

2. The method as claimed in claim 1, wherein the security rules are configurable.

3. The method as claimed in claim 1, wherein a Radio Frequency Identification (RFID) chip is used as the identification object.

4. The method as claimed in claim 1, wherein for the further identification of the user, at least one of a) a chip card is read by a card reader, b) the user is requested to input a password and c) the user is requested to input a PIN number.

5. The method as claimed in claim 1, wherein when the security rules are accessed, the central security module determines which devices required for execution of the security rules are connected to the work station.

6. The method as claimed in claim 1, wherein the user is automatically logged off after an inactive time period.

7. The method as claimed in claim 6, wherein different time periods are defined for each of the at least one role and the at least one further role.

8. The method as claimed in claim 1, wherein for the application-related action to be carried out by way of a temporary login of a further user at the work station, the further user's role and the assigned authorizations are taken over.

9. The method as claimed in claim 8, wherein after the application-related action has been carried out, the further user is automatically logged off.

10. The method as claimed in claim 1, wherein after a further user logs in at the work station, roles are switched, with settings of the user being maintained.

11. A data processing network, comprising:
    a plurality of individual devices, the data processing network configured to,
    allocate at least one role stored in a central authorization register to a user, upon a portable identification object of the user being read wirelessly by a login read device to log the user in at a work station of the data processing network, such that the user can execute a number of applications and functions without a further identification process;
    determine, upon an application being called up and via a local security module of the application, authorizations granted for the allocated at least one role of the user;
    access via a central security module, when there is not sufficient authorization granted for an application-related action, a central collection of security rules indicating circumstances in which, when the granted authorizations are not sufficient to carry out the application-related action, the user can still carry out the application-related action;

determine whether, according to at least one of the security rules, a usage authority is possible for the application-related action and conveying the possibility, when determined, to the user; and upon determining that there is not sufficient authorization granted to the allocated at least one role of the user with which the user is logged in to carry out the application-related action, determining that the user is allocated at least one further role in addition to the role with which the user is logged in, determining that the at least one further role has sufficient authorization to carry out the at least one application-related action, transferring the authorization of the at least one further role to carry out the application-related action to the role with which the user is logged in, and executing a security rule that allows the application-related action to be carried out without additional identification of the user, wherein when further identification of the user is necessary for the user to carry out the application-related action and more than one security rule permits execution of the application-related action, the central security module at least one of a) selects one security rule, b) displays a list of the security rules for user selection and c) proposes a security rule determined based on a prioritization.

12. The data processing network as claimed in claim 11, wherein the plurality of individual devices are further configured to process medical engineering data, in particular image data.

13. The method as claimed in claim 2, wherein data from a portable identification object of the user is read wirelessly by use of a login read device to log in at the work station.

14. The method as claimed in claim 13, wherein an RFID chip is used as the identification object.

15. The data processing network as claimed in claim 11, wherein the plurality of individual devices are further configured to process image data.

\* \* \* \* \*

UNITED STATES PATENT AND TRADEMARK OFFICE
CERTIFICATE OF CORRECTION

| | | |
|---|---|---|
| PATENT NO. | : 8,365,263 B2 | Page 1 of 1 |
| APPLICATION NO. | : 12/318454 | |
| DATED | : January 29, 2013 | |
| INVENTOR(S) | : Dasch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this
Second Day of December, 2014

Michelle K. Lee
*Deputy Director of the United States Patent and Trademark Office*